(12) United States Patent
Warner

(10) Patent No.: US 6,612,825 B2
(45) Date of Patent: Sep. 2, 2003

(54) PILLOW CUTTING EXTRUDER MACHINE

(75) Inventor: Richard Jarvis Warner, Boca Raton, FL (US)

(73) Assignee: American Extrusion International Corp., South Beloit, WI (US)

(*) Notice: Subject to any disclaimer, the term of this patent is extended or adjusted under 35 U.S.C. 154(b) by 55 days.

(21) Appl. No.: 09/947,771

(22) Filed: Sep. 7, 2001

(65) Prior Publication Data

US 2003/0049341 A1 Mar. 13, 2003

(51) Int. Cl.⁷ .......................... B29C 43/24; B29C 47/32
(52) U.S. Cl. ............... 425/133.1; 425/294; 425/296; 425/194; 425/DIG. 235
(58) Field of Search ............... 425/327, 133.1, 425/194, 299, 294, 296, DIG. 235

(56) References Cited

U.S. PATENT DOCUMENTS

| | | | |
|---|---|---|---|
| 4,028,024 A | * | 6/1977 | Moreland ............. 425/133.1 |
| 5,030,079 A | * | 7/1991 | Benzing, II ........... 425/140 |
| 5,100,312 A | * | 3/1992 | Wiener ............... 425/186 |
| 5,297,947 A | * | 3/1994 | Cardinali ............. 425/194 |

FOREIGN PATENT DOCUMENTS

| | | | |
|---|---|---|---|
| IT | 000061538 A1 | * | 6/1982 |
| JP | 406099430 | * | 4/1994 |

OTHER PUBLICATIONS

American Extrusion Pillow Cutter Advertising Flyer—So. Beloit IL, U.S.A.

* cited by examiner

*Primary Examiner*—Robert Davis
*Assistant Examiner*—Joseph S Del Sole
(74) *Attorney, Agent, or Firm*—James Van Santen

(57) ABSTRACT

The pillow cutter of a food product extrusion system is provided with motor driven roller means designed to pull filled, or unfilled, extrusions, including hollow tubes, or ropes, of extruded food material from the extrusion die head. The ropes are then cut in various shapes such as square, diamond or triangle pillows, sticks or bars. The roller means constitute rotatable base rollers sized to effect telescopic assembly with removable, interchangeable, tubular, cylindrical cutter sleeves engraved on the outer peripheral surface of the sleeves with variable cutting patterns so the user of the system can optionally change the cutting patterns by selective choice of cutter sleeves.

7 Claims, 7 Drawing Sheets

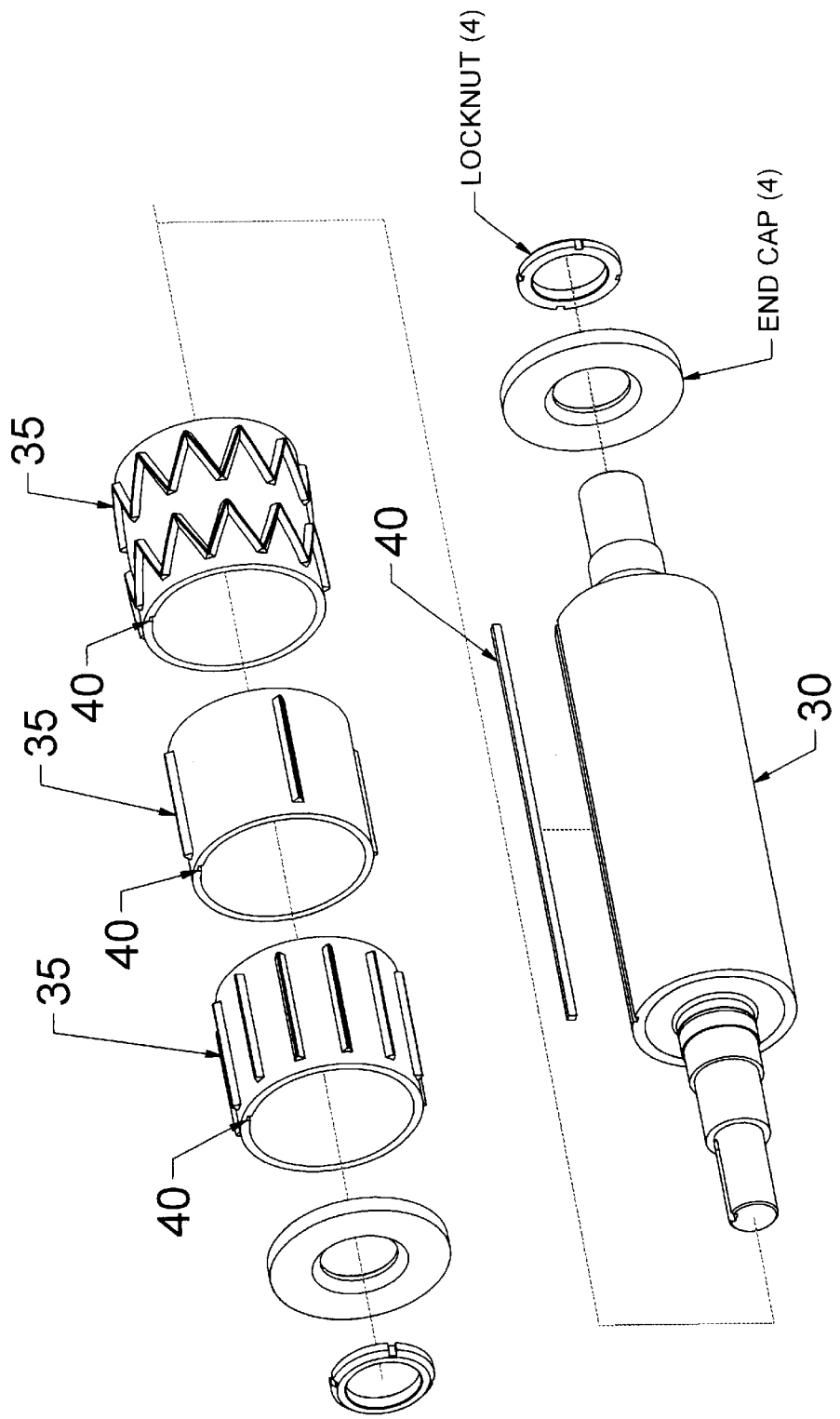

PILLOW CUTTING EXTRUDER MACHINE

BACKGROUND OF THE INVENTION

1. Field of the Invention

This invention relates generally to food extrusion machines for making food products such as snack foods, pastas, cereals and pet food, and more particularly to a pillow cutting system for such a machine utilizing removable, interchangeable cutting sleeves telescopically mounted on motor driven base rollers.

2. The Prior Art

The prior art is exemplified by machines currently manufactured and sold by the assignee of the present invention, American Extrusion International, Inc. A typical process utilizing such a system has a pair of pillow cutter rollers forming a nip and designed to receive and pull ropes of extruded raw material from the extrusion head of the machine. The rollers are electroless nickel plated cylindrical articles with patterns engraved on the confronting peripheral faces of the rollers. In operation, the rollers cut the extruding ropes into square or triangular pillows. Long or short filled bars can also be created with the same system.

In order to achieve a change of the pillow patterns, it is necessary to replace the entire set of rollers. Consequently, to effect such a change, the pillow cutter machine must be virtually disassembled, the pillow rollers removed, and an entirely new set of rollers installed. That is a time consuming and laborious task which is expensive and necessitates the requirement of stocking different matching sets of costly nickel plated rollers, or, acquiring an entirely separate pillow cutter machine, if and when a different cutting pattern is desired.

SUMMARY OF THE PRESENT INVENTION

A single set of rollers consisting of two base rollers are provided which can be permanently mounted in the pillow cutting machine. In accordance with this invention, a plurality of sets of removable, interchangeable, cylindrical sleeves are provided. Each sleeve is sized and shaped so that it may be selectively assembled or disassembled from a corresponding base roller with great facility and convenience simply by telescopically fitting and sliding the sleeve on to the base roller. The sleeves and the base rollers are keyed with appropriate piloting means so that proper pilot orientation and timing are insured.

The individual sleeves have engraved peripheral surfaces to provide individually selectable patterns. Thus, the user may produce cut products in whatever shape is desired; square pillows, triangular pillows, long bars, short bars, sticks, diamonds, bell shapes or repetitive patterns of other geometric shapes and of bigger or smaller sizes.

DESCRIPTION OF THE DRAWINGS

FIG. 8 is an enlarged partial view showing a close up of the pillow cutter rollers of the present invention, but with parts broken away and with sleeve parts shown in exploded arrangement to illustrate additional features of the invention.

DETAILED DESCRIPTION OF THE PREFERRED EMBODIMENTS

Figure 2:
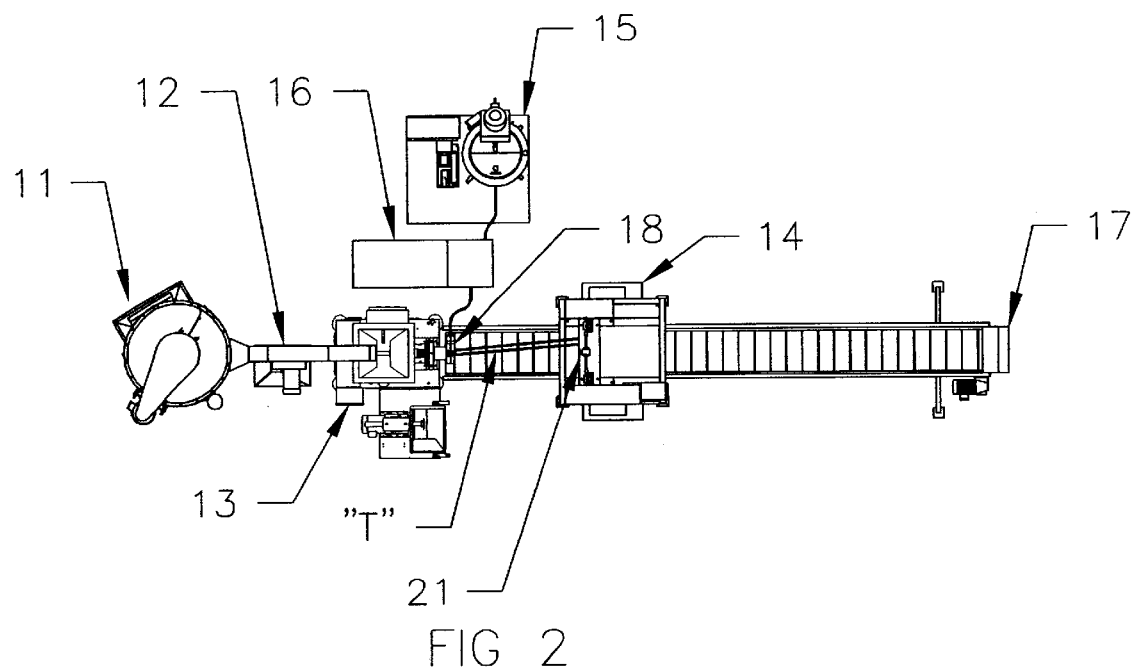
FIG. 2 is a plan elevational view of the extrusion line of FIG. 1.
Figure 1:
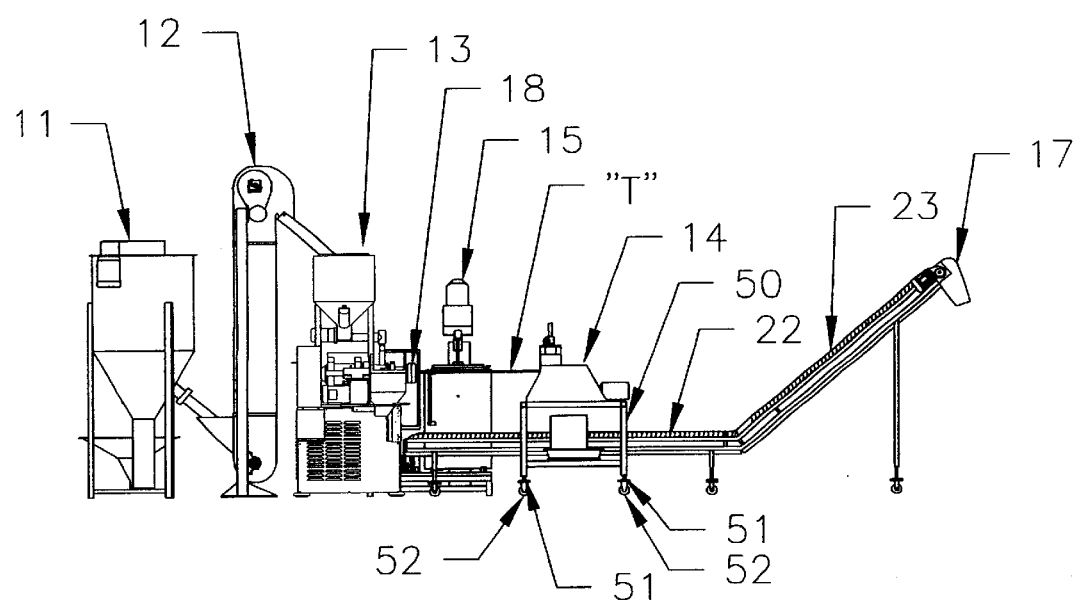
FIG. 1 is a side elevational view of a typical bake type extrusion line with a pillow cutter of the present invention.
Figure 3:
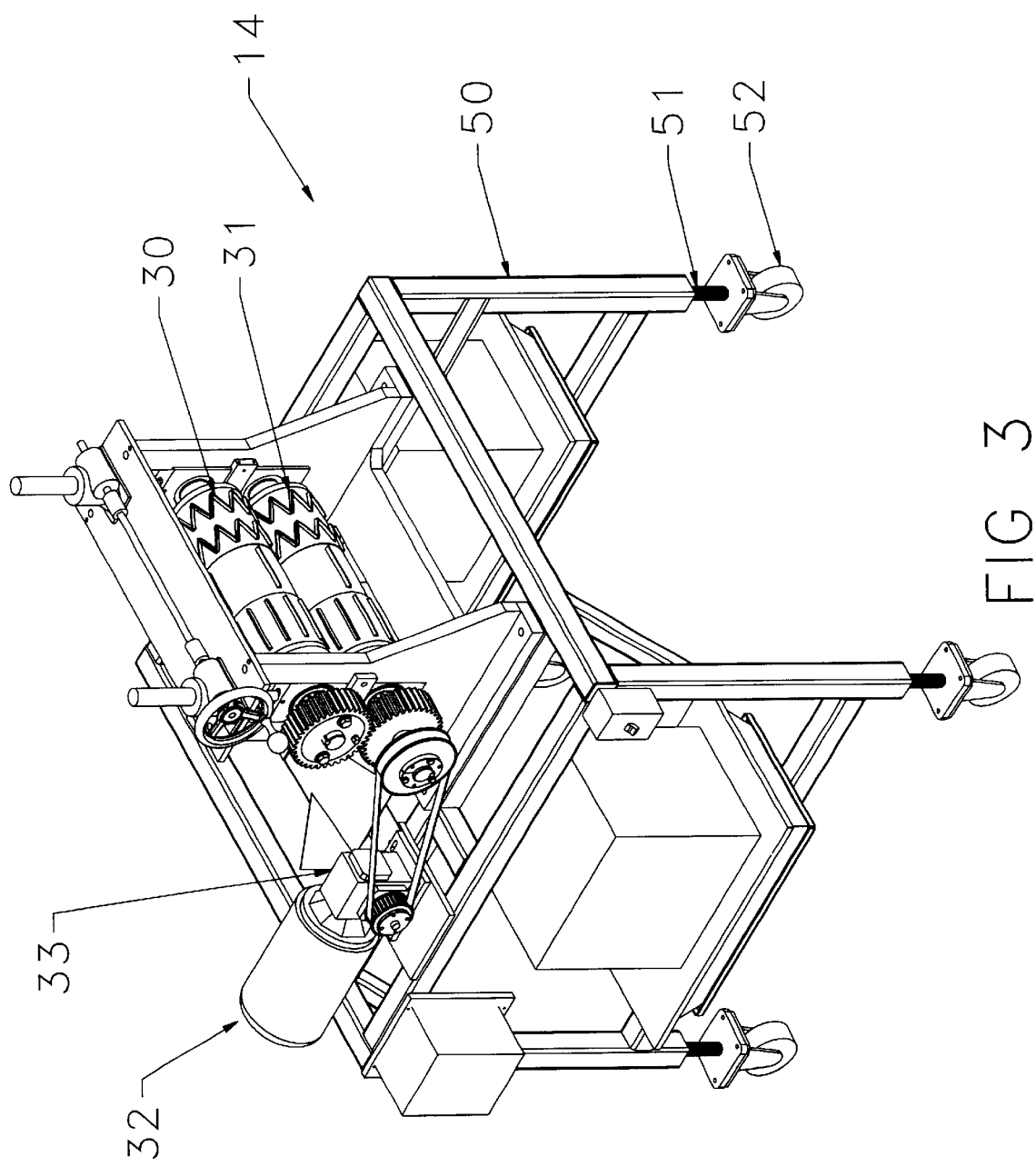
FIG. 3 is a perspective view of a pillow cutter component utilized in the extrusion line of FIGS. 1 and 2, but with parts removed to show additional details of construction.
Figure 4:
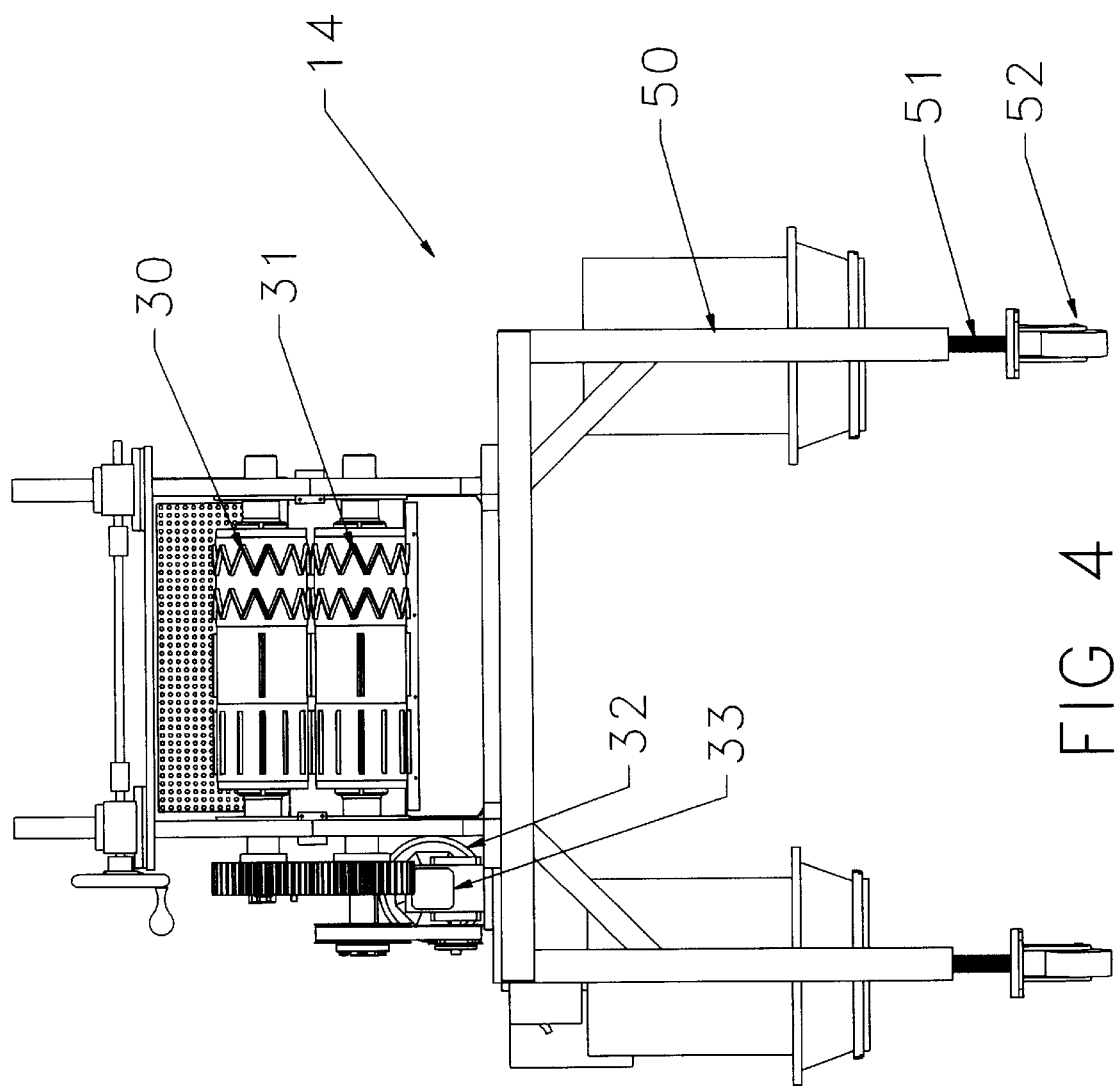
FIG. 4 is a front elevational view of the pillow cutter component of FIG. 3.
Figure 5:
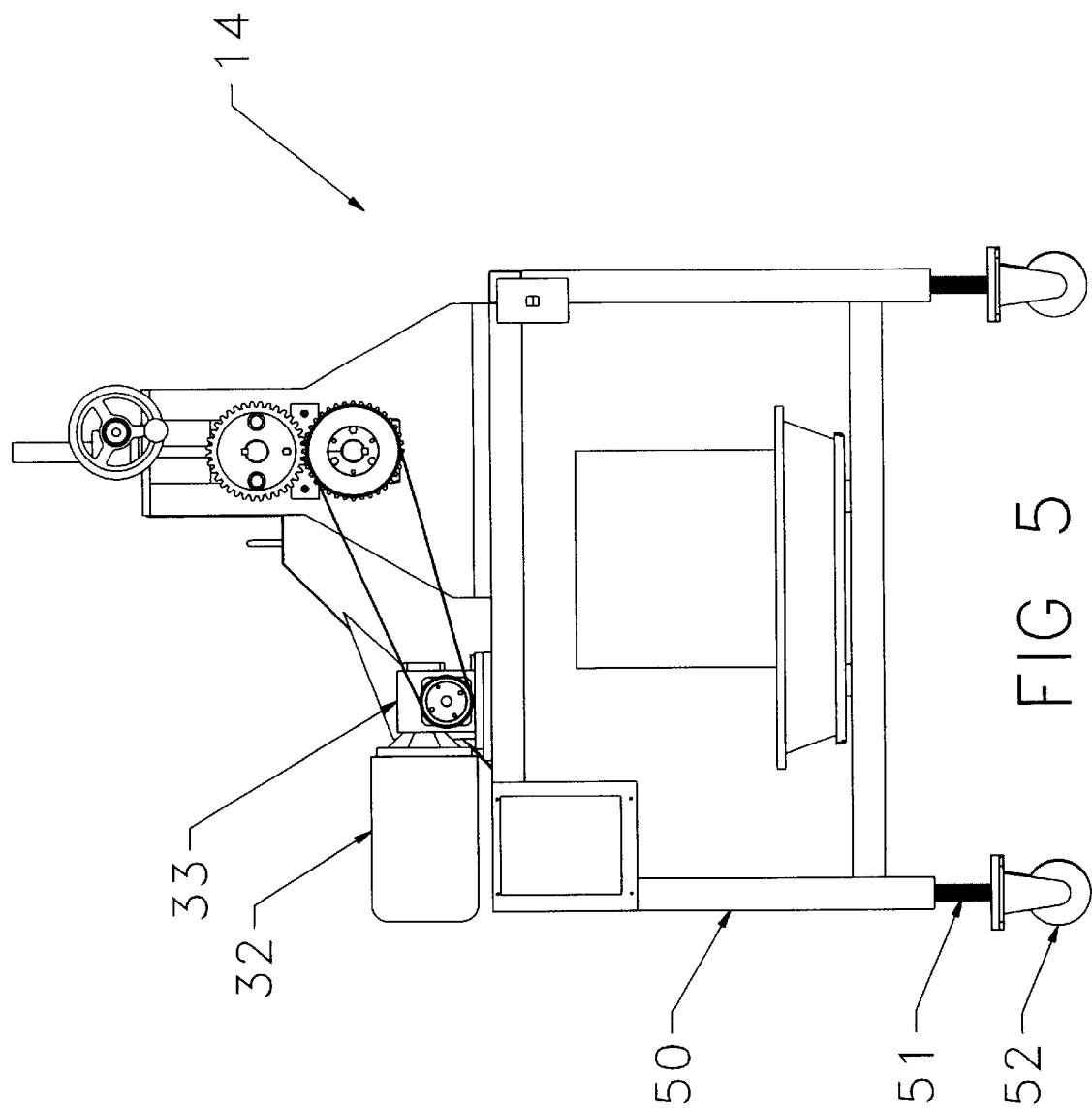
FIG. 5 is an end elevational view of the pillow cutter component of FIGS. 3 and 4.
Figure 6:
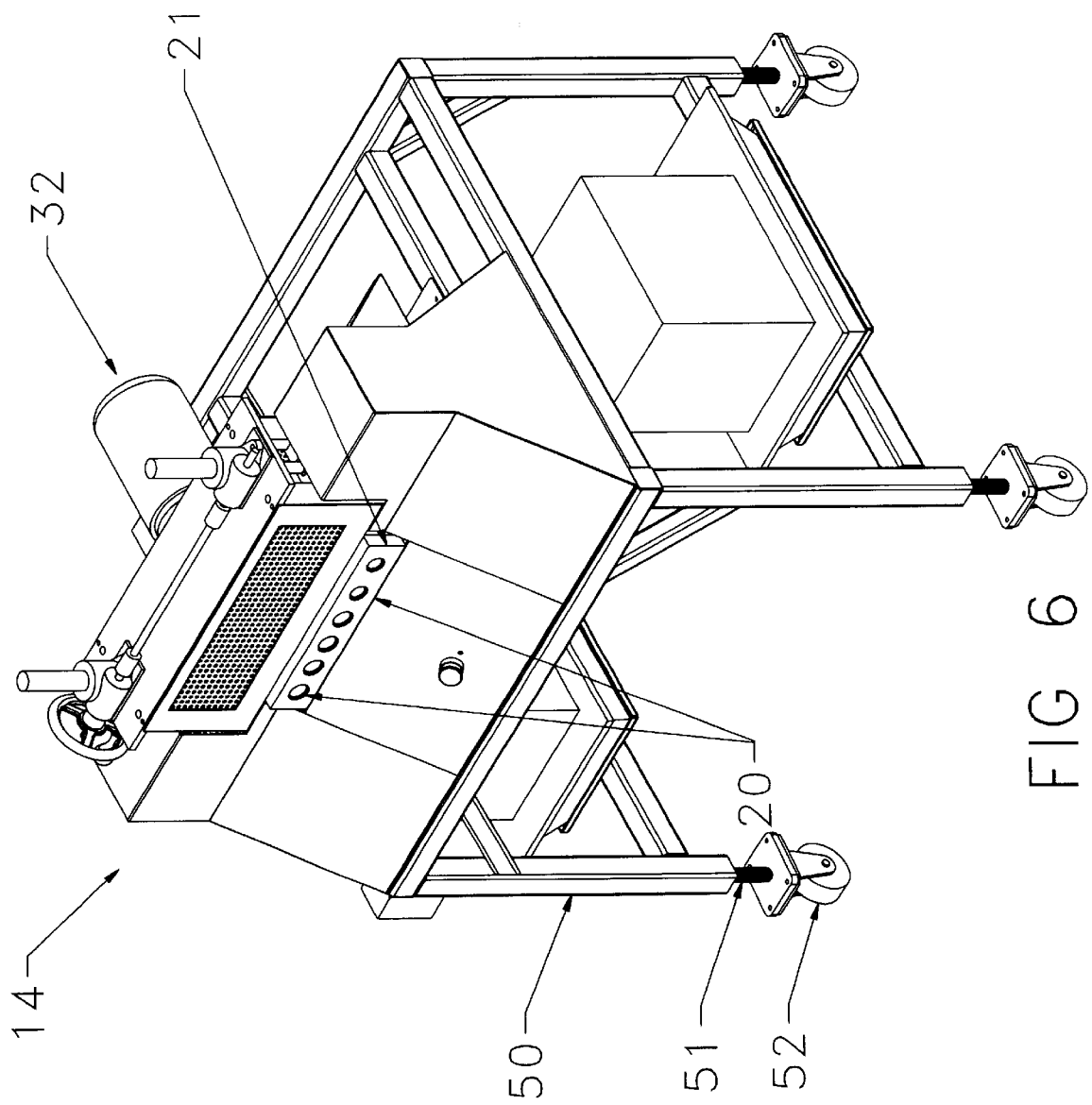
FIG. 6 is a perspective view generally similar to FIG. 3, but illustrating the pillow cutter assembly.
Figure 7:
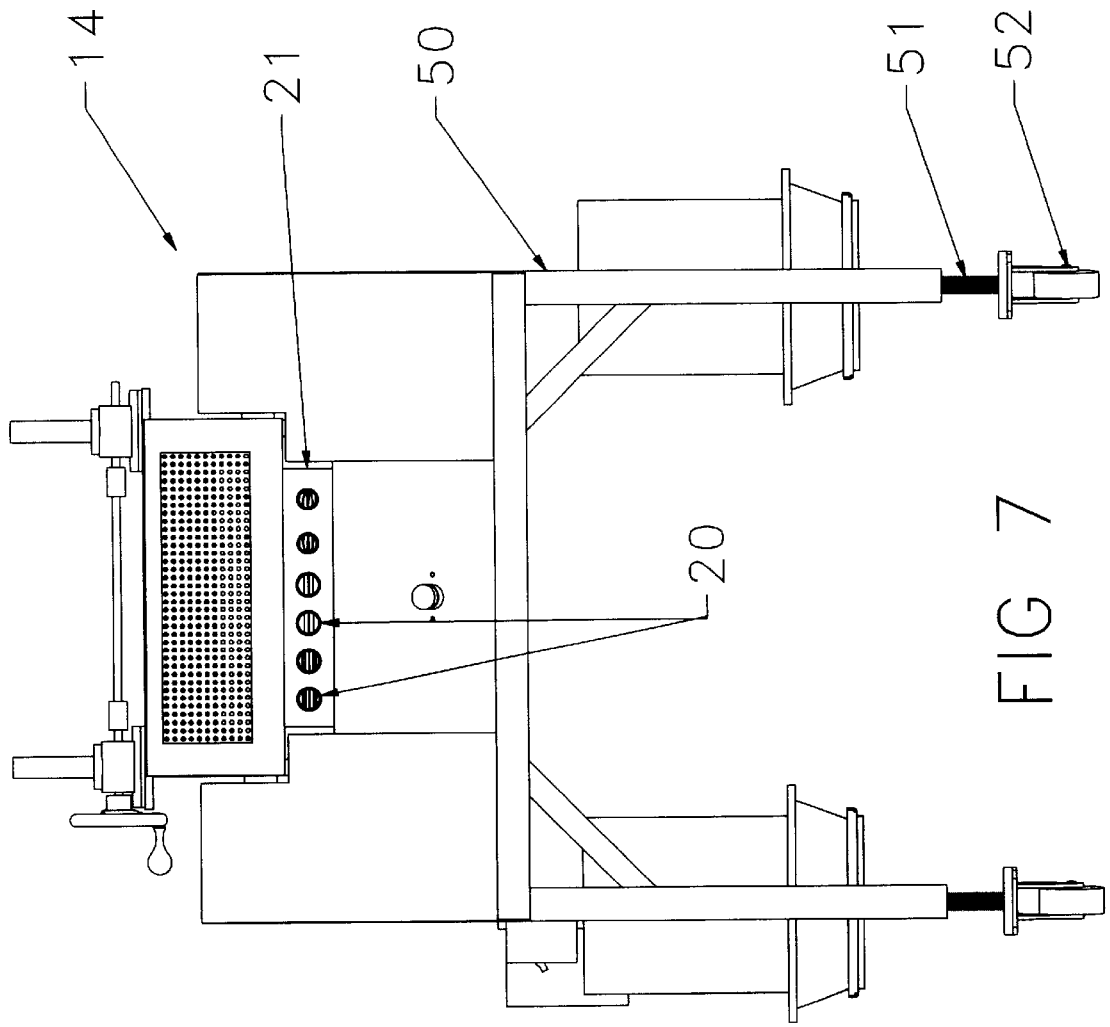
FIG. 7 is front elevational view of the assembly of FIG. 6.

Referring to FIGS. 1 and 2, a vertical mixer 11 adds moisture to raw material, such as corn, prior to being conveyed by a bucket elevator 12 to an extruder hopper 13. The extruder 13 gelatinizes the raw material and forms a tube of extruded material "T" through a die opening, or gap provided by a die head 18.

During the process, a positive displacement pump 16 receives a filling material, such as a cream filling, from a mixing tank 15 and forces the cream filling through the center of the tube "T" created by the die head 18 of the extruder 13.

The coextrusion action takes place within the die head 18 which is a specially configured die at the head of the extruder 13. As the filled tube "T" exits the die head 18 of the extruder 13, it resembles a rope which may be physically grasped by the operator of the machine and fed into and through one of a plurality of inlet guide openings 20 formed in a front wall 21 of the pillow cutter machine 14. The function of the pillow cutter machine 14 is to shape the product and discharge the shaped product on to a conveyor 22 which has a horizontal incline section 23 suitable for discharging the final product as at 17 into a subsequent down stream station of the product processing stream.

Referring specifically to FIGS. 3, 4, 5 and 8, instead of the usual unitary pillow cutter rollers of the prior art, there is provided a two-element roller means. The first element consists of a pair of base rollers 30 and 31 which are mounted in the pillow cutter machine 14 and are rotatably driven by an electric motor 32 mechanically coupled to the base rollers 30 and 31 by a suitable power train 33.

In further accordance with this invention, a second element of the roller means is provided in the form of a plurality of individual, removable, interchangeable, cylindrical sleeves, preferably paired in sets of two, so as to be complemental to one another. For purposes of clarity, each separate sleeve is designated by the same reference number 35. It is contemplated that each sleeve 35 will be formed as a cylindrical tube having an inside diameter sized for a telescopic slide-on assembly with a corresponding base roller 30 and 31 having an outside diameter of complemental size. The length of each tube 35 is preferably proportioned to be a fractional relationship of the axial length of the base rollers, so that a plurality of paired tubes 35 may be assembled on the peripheral surfaces extending from end-to-end of the base rollers 30 and 31.

The outside diameter of each sleeve 35 is nickel plated and engraved with a pattern corresponding to a desired cutting pattern. It will be understood that paired sleeves 35 will be engraved with matching patterns so that they may be installed on the upper and lower base rollers 30 and 31 for mutually compatible operation.

As shown in the drawings, each sleeve 35 and each base roller 30 and 31 is provided with pilot keying means 40 to insure proper orientation of the cutting patterns and timing of the roller rotation.

In operation, the pillow cutter 14 by means of the nip formed between two engaging sleeves 35 mounted on the base rollers 30 and 31 will pull filled ropes of the extruded product "T" from the extrusion die head 18 of the extruder 13. The ropes, whether filled, or unfilled, will then be cut in various shapes depending on the choice of the sleeves 35 mounted on the base rollers 30 and 31; square, diamond or triangle pillows, sticks or bars. These products can then be packaged or coated, for example, with chocolate, prior to packaging.

By utilizing an appropriate formula for the extruded material, the products do not require being baked. Finished product moisture is at a level which gives a similar crispiness and shelf life to products like wafer and cereals.

The pillow cutter machine 14 comprises a stand which is mounted on legs 50 which include screw threaded height adjustment means 51 and castered wheels 52. The machine 14 is both portable and adjustable and may be incorporated in, or removed from, an extrusion system line at will. It should also be noted that with the use of multiple interchangeable sleeves 35, the line can be established with multiple extrusion die heads 18 so that a corresponding plurality of separate extruded products can be extruded simultaneously, formed into "T" shaped ropes, and fed into spaced apart openings 20 in the wall 21 for independent cutting in different patterns by the sleeves 35 on the base rollers 30 and 31.

Although minor modifications might be suggested by those versed in the art, it should be understood that I wish to embody within the scope of the patent warranted hereon all such modifications as reasonably and properly come within the scope of my contribution to the art.

I claim as my invention:

1. In a food product extrusion line providing a product processing stream for extruding food products, namely, snack foods, pastas, cereal and pet food,
   an extruder machine at a first station in said line having a supply of gelatinous raw material and having multiple die heads each extruding said raw material in the form of a separate tube resembling a rope-like article exiting from a corresponding one of multiple die openings in said die heads,
   the improvement of
   a pillow cutter machine at a second station in said line downstream of and in register with said extruder machine to shape, cut and then discharge an edible finished product into the processing stream towards a subsequent downstream station in said line,
      a front wall on said pillow cutter machine forming a row of spaced apart multiple inlet guide openings,
      each said rope-like article being directed into a corresponding one of said inlet guide openings in said front wall,
   said pillow cutter machine being particularly characterized by the provision of rotatably driven, motorized, two-element roller means,
      a first element of said two-element roller means consisting of a single pair of base rollers permanently mounted in said pillow cutter machine and rotatably driven by an electric motor mechanically coupled to said base rollers by a power train,
      a second element of said two-element roller means comprising a plurality of individual, removable, interchangeable, cylindrical sleeves paired in separate sets of two such sleeves so as to be structurally and functionally complemental to one another,
         each said sleeve having an inside diameter sized for a telescopic slide-on assembly with a corresponding base roller,
         the longitudinal length of each said sleeve being such that it is proportioned to be in a fractional relationship with the axial length of said bas rollers,
   whereby a plurality of paired sleeves are assembled on the peripheral surfaces extending from end-to-end of said base rollers to form multiple paired sets of sleeves corresponding in number to the multiple rope-like articles,
      the outside diameter of each said sleeve having a cutting pattern means and said separate sets of two sleeves having matching patterns for mutually compatible operation,
      each set of sleeves forming a separate nip pulling a corresponding rope-like article from a corresponding inlet guide opening and shaping, cutting and discharging finished products downstream in the processing stream to the next station in the line,
   said multiple paired sets of sleeves forming multiple separate nips and being optionally selected from a group of geometrically patterned sleeves consisting of squares, diamonds, triangle pillows, sticks or bars, and
   said sleeves being mounted on said base rollers with each pair of sleeves simultaneously independently, shaping and cutting food products from said rope-like articles in multiple optionally chosen geometric patterns.

2. In a food product extrusion line as defined in claim 1, said pillow cutter machine comprising a stand which is mounted on legs having screw threaded height adjustment means and castered wheels,
   whereby said pillow cutter machine is both portable and adjustable and may be incorporated in, or removed from, the extrusion line selectively at will, and adjusted to be in proper alignment with said extruder machine.

3. In a food product extrusion line as defined in claim 1, a positive displacement ream filling pumping means at said first station forcing cream filling through the center of a tube created by a die head of the extruder, thereby to provide a cream filled tube prior to entering the pillow cutter machine.

4. In a food product extrusion line as defined in claim 1, said roller means having piloting keying means between said base rollers and said removable sleeves to insure proper piloting orientation and timing of the complemental patterns on the paired sleeves.

5. In a food product extrusion line as defined in claim 1, the outside diameter of each said sleeve being nickel plated and engraved with a pattern corresponding to a desired cutting pattern selected from a group of geometric shapes consisting of square, diamond, triangle, pillow, sticks or bars.

6. In a food product extrusion line as defined in claim 1, means in said line downstream of said pillow cutter machine and further processing the products discharged into the processing stream by coating such products with chocolate.

7. In a food product extrusion line as defined in claim 1, said extruder machine have at least three die heads with at least three corresponding die openings, thereby to extrude at least three separate tubes resembling three separate rope-like articles simultaneously, and
   said pillow cutter machine having at least three paired sets of sleeves assembled on said single pair of base rollers, thereby to form at least three separate nips each pulling a corresponding one of said three rope-like articles with each pair of sleeves simultaneously and independently shaping and cutting food products in three optionally chosen geometric patterns.

* * * * *